Figure 1:
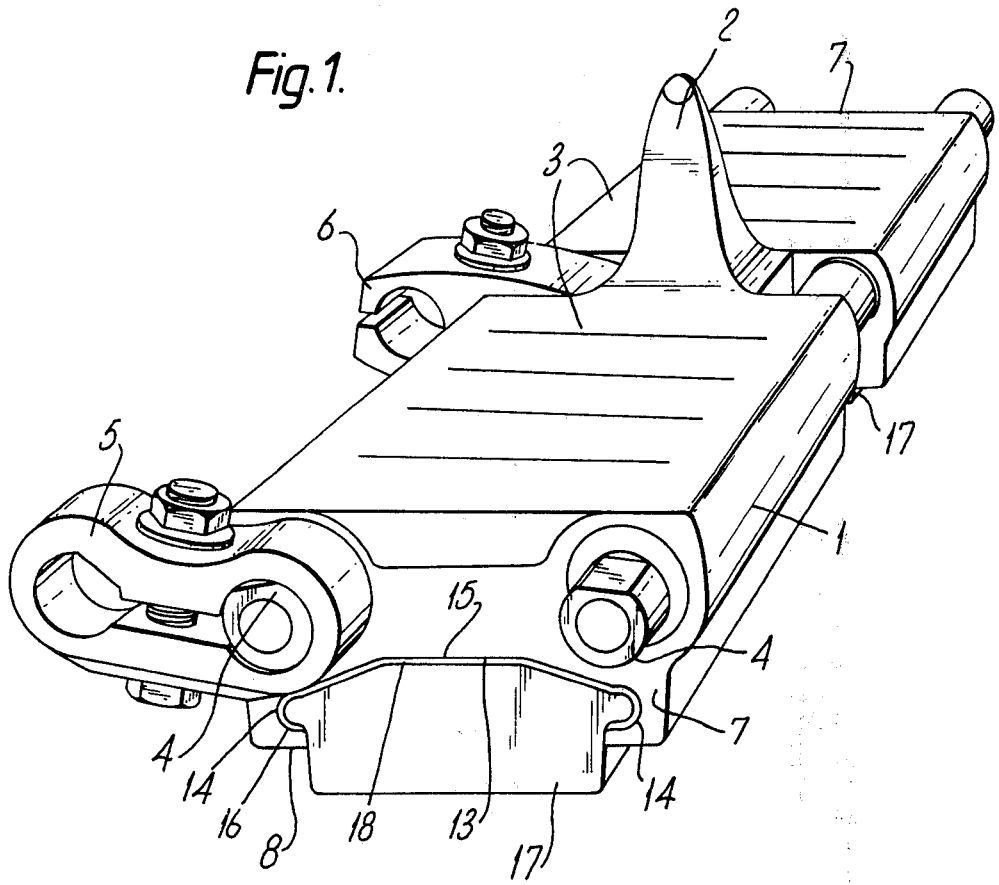

United States Patent [19]

Parker

[11] 4,444,441
[45] Apr. 24, 1984

[54] TRACK LINK FOR A TRACKED VEHICLE

[75] Inventor: Robert A. Parker, Camberley, England

[73] Assignee: The Secretary of State for Defence in Her Britannic Majesty's Government of the United Kingdom of Great Britain and Northern Ireland, England

[21] Appl. No.: 283,195

[22] Filed: Jul. 14, 1981

[30] Foreign Application Priority Data

Jul. 14, 1980 [GB] United Kingdom ............... 8022932

[51] Int. Cl.³ .......................................... B62D 55/22
[52] U.S. Cl. ................................... 305/35 R; 305/55
[58] Field of Search .................. 305/46, 50, 51, 54, 305/55, 39, 35 R, 35 EB, 36

[56] References Cited

U.S. PATENT DOCUMENTS

| 3,071,417 | 1/1963 | Militana | 305/54 |
| 3,870,380 | 3/1975 | Korner | 305/36 |
| 4,165,906 | 8/1979 | Fix | 305/51 |

FOREIGN PATENT DOCUMENTS

| 2307634 | 8/1974 | Fed. Rep. of Germany | 305/55 |
| 1157428 | 7/1969 | United Kingdom | 305/35 R |

*Primary Examiner*—Joseph J. Rolla
*Assistant Examiner*—Michael S. Huppert
*Attorney, Agent, or Firm*—Cushman, Darby & Cushman

[57] ABSTRACT

A track link is provided with a slideway (13) in which a steel or nylon load bearing shell (18) bonded to a rubber road engagement pad (17) can be speedily engaged. The load bearing shell has a bowed cross-sectional configuration which extends laterally in the slideway to increase retention when subjected to centrifugal forces tending to tear the pad away from the link.

7 Claims, 9 Drawing Figures

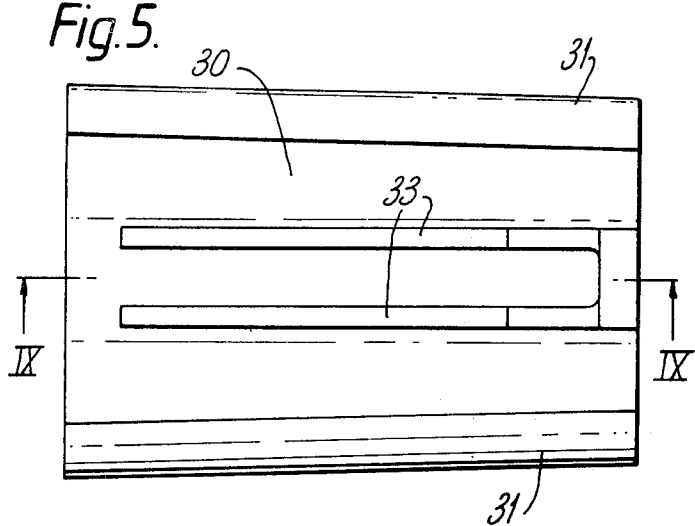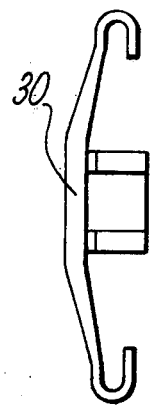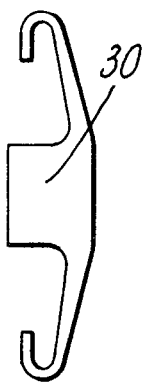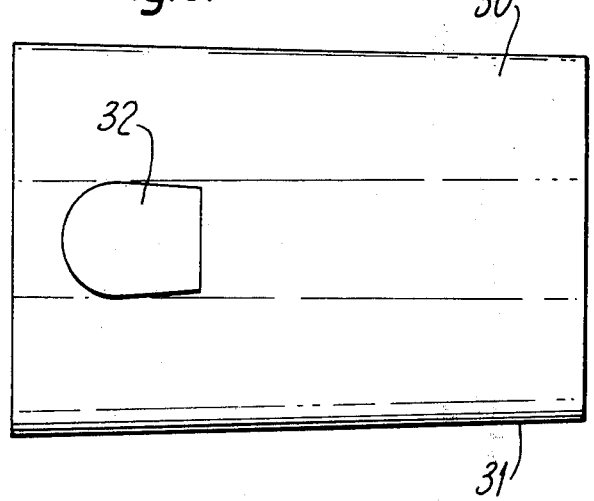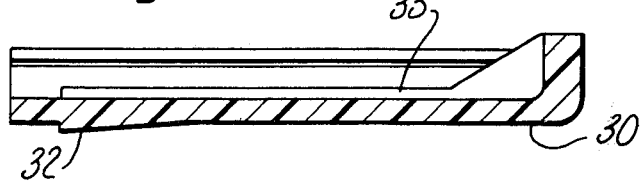

TRACK LINK FOR A TRACKED VEHICLE

This invention relates to a track link for a tracked vehicle, the link being of the type having a detachable ground engagement pad.

Various types of ground engagement pads are known, most of which comprise a resilient pad bonded to a metal bearer plate. The bearer plate may be directly bolted to the track link or, where speedy replacement is required, the plate may be shaped so as to slide into a channel having two opposing grooves, herein referred to as a slideway, in the track link, where it may be secured against an end stop either by screw fixing means or by a resilient look, as described in British Pat. Specification No. 1,405,742 for example.

In use, track links are subjected to extreme centrifugal forces when they reach the upper leading end of the track, their forward velocity then being abruptly reduced to zero, as the link changes direction, from twice that at which the vehicle is travelling. The centrifugal forces generated at that moment can be of the order of 150 g for a vehicle travelling at 35 to 40 miles per hour, with the result that the bearer plate of a ground engagement pad will momentarily deform and, in the case of the slidably located variety, can lose lateral retention in the slideway sufficiently to be thrown out.

The present invention seeks to provide a track link having a slidable ground engagement pad which will not readily disengage from the link under the action of centrifugal forces.

Accordingly the present invention comprises a track link for a tracked vehicle including: a ground opposable face containing at least one slideway; a load bearing shell of bowed cross-sectional configuration longitudinally insertable into the slideway; and a resilient ground engagement pad secured to the concave surface of the load bearing shell so as to protrude transversely therefrom along its length, the shell being disposed in the slideway in use, with the pad protruding outwardly from the ground opposable face. For maximum resistance of the pad to shear encountered in use, the slideway is preferably disposed transversely to the direction of motion of the track link.

Both the slideway and the load bearing shell may be parallel sided and provided with co-operative stops which abut when the shell is fully inserted in the slideway. Alternatively both may be slightly tapered so as to interlock only when the shell is fully inserted in the slideway, with the advantage of greater ease of insertion and withdrawal.

The bowed cross-sectional configuration of the load bearing shell ensures that, when the shell is located in the slideway, centrifugal forces directed outwardly through the ground opposable face act to flatten the bow, thereby extending it laterally within the slideway and advantageously increasing its lateral retention.

Preferably, fastening means are also provided to retain the shell in the fully inserted position, which means may comprise a screw fastener or a snap lock.

Preferably the bowed cross-sectional configuration of the shell has incurved edges, e.g. C-form, so as to provide bearing surfaces at both inner outer interfaces with the slideway, and the shell may conveniently comprise a longitudinal part-cylinder or part-cone of flattened, basically elliptical cross-section, locatable in the slideway with its major axial plane disposed parallel with the ground opposable face.

The load bearing shell may be a metal such as steel or a plastics material such as nylon, either of which may be bonded directly to a rubber or elastomeric ground engagement pad. Alternatively the shell may itself be of hard rubber or elastomer, moulded integrally with a pad of similar but softer material.

Figure 2:
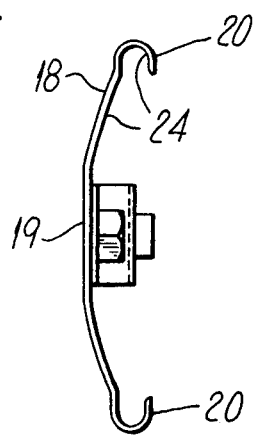
Figure 3:
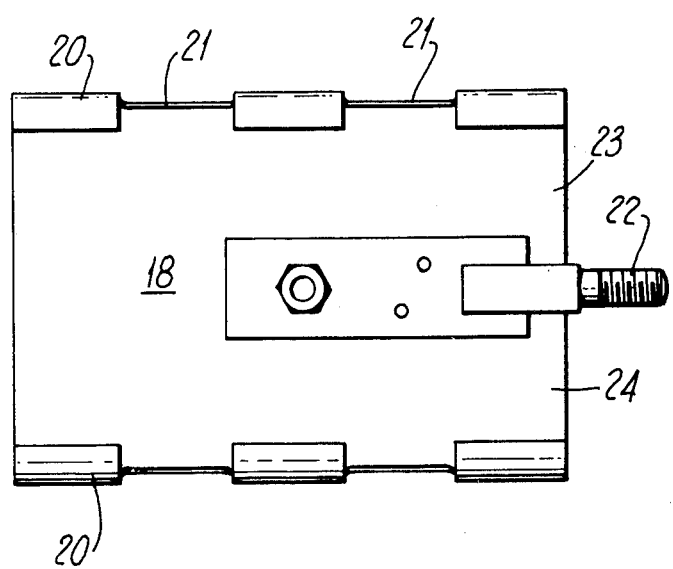
Figure 4:
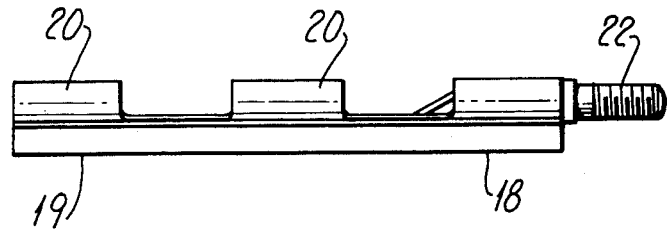

Embodiments of the invention will now be described by way of example only with reference to the following drawings of which FIG. 1 is a perspective view of a track link having twin parallel-sided slideways, each fitted with a load bearing shell and a ground engagement pad, FIGS. 2, 3 and 4 are end, underside and side views respectively of the load bearing shell illustrated in FIG. 1.

FIGS. 5 to 8 are underside, top and both end views respectfully of an alternative, tapered load bearing shell suitable for use in a correspondingly tapered slideway, and FIG. 9 is a section on line IX—IX of FIG. 5.

The track link 1 illustrated in FIG. 1 has a central horn 2, wheel paths 3, rubber bushed pins 4, end and center connectors 5 and 6 for coupling to a further pin 4 of an adjoining similar link (not shown), opposing end faces 7, and a ground opposable face 8.

The face 8 is provided with two identical parallel-sided slideways 13, axially aligned and accessible one from each end face 7, each having opposed retaining grooves 14, an inner bearing surface 15 and outer bearing surfaces 16. Located in each slideway 13 is a rubber ground engagement pad 17 encased at its slideway-adjacent surfaces in a steel, load bearing shell 18.

The load bearing shell 18, which is illustrated in detail in FIGS. 2, 3 and 4, is a flattened, longitudinal part-cylinder having an inner bearing surface 19 adjacent the inner bearing surface 15 and outer bearing surfaces 20 adjacent the outer bearing surfaces 16. Gaps 21 provided in the bearing surfaces 20 enable the weight of the shell to be reduced without serious impairment of its function. An axial stub screw 22 is attached to the leading end 23 of the shell 18, and the pad 17 (FIG. 1) is bonded to the internal surface 24 of the shell. The complete assembly is inserted, end 23 first, into the slideway 13 until the screw 22 locates in a clearance hole (not shown) at the far end of the slideway where it can be secured with nuts (not shown).

In operation, when the track link 1 is bearing the weight of a supported vehicle (not shown) and the pads 17 are in engagement with the ground, the load is transmitted via the interface of inner bearing surfaces 15 and 19 of each slideway 13 and shell 18 respectively. When the link is no longer bearing the weight of the vehicle and is being subjected to centrifugal forces acting outwardly from the link 1 through the pad 17, the outer bearing surfaces 20 of each shell 18 are forced against the outer bearing surfaces 16 of the respective slideway 13 and the bowed configuration of the shells flattens, causing the inner bearing surfaces 15 and 19 to separate and the lateral extremities of the shells to extend outwardly to engage more forcibly in the retaining grooves 14. This flattening of the bowed shell also increases the grip of the lateral edges of the shell 18 upon the pad 17.

An alternative load bearing shell 30 having tapered edges 31, for insertion in a correspondingly tapered slideway (not shown) is illustrated in FIGS. 5 to 9. This load bearing shell is integrally moulded in nylon and reacts in operation with its slideway in exactly the same manner as that described for the preceding embodiment.

The shell 30 is provided with a locking tongue 32 centred at the apex of the bowed configuration, which causes the shell to compress inwardly whilst being pushed along the slideway until the shell and slideway tapers are fully engaged, whereupon the tongue snaps outwardly into engagement with a corresponding aperture (not shown) in the slideway. Axial ribs 33 provide reinforcement of the tongue 32 in its condition of engagement with the slideway. Obviously, the parallel-sided shell of FIG. 1 could be of similar construction.

An additional advantage of the bowed configuration of the load bearing shell of this invention is that its inherent flexibility permits its insertion into a cast slideway requiring no expensive machining.

The invention further provides an appreciable saving in weight over conventional bolt-on bearer plates and, in the case of the nylon shell, a considerable cost saving.

I claim:

1. A track link for a tracked vehicle comprising:
   means defining a ground opposable face containing at least one slideway;
   a load bearing shell longitudinally insertable into said slideway, said shell having a central longitudinal portion with bowed cross-sectional configuration and edge longitudinal portions on opposite sides of said central longitudinal portion, each of said edge portions being turned back to define a "C" shaped cross section, the area of each said edge portion adjacent said central portion being substantially parallel to said ground opposing face and defining with said central portion an inner bearing surface and the area of each said edge portion parallel to said inner bearing surface defining an outer bearing surface, said inner and outer bearing surfaces of said edge portions engaging said slideway; and
   a resilient ground engagement pad secured to the concave surface of said load bearing shell so as to protrude outwardly therefrom beyond said outer bearing surfaces, said shell being disposed in said slideway in use with the pad protruding outwardly from the ground opposable face so that when said shell and said pad are subjected to outwardly acting centrifugal forces, said bowed central portion and said edge portions are flattened by reactive forces generated at said outer bearing surfaces, thereby increasing the grip of said shell upon said pad and extending said shell laterally to increase its retention in said slideway.

2. A track link as claimed in claim 1 wherein said slideway and said load bearing shell are both parallel-sided.

3. A track link as claimed in claim 1 wherein said slideway and said load bearing shell are correspondingly tapered so as to engage fully only when the shell is fully inserted in the slideway.

4. A track link as claimed claim 1 having fastening means for retaining said load bearing shell in a fully inserted position within the slideway.

5. A track link as claimed in claim 4 wherein said fastening means is a screw fastener.

6. A track link as claimed in claim 4 wherein said fastening means is a snap lock.

7. A track link as claimed in claim 1 wherein said load bearing shell is integrally moulded with said ground engagement pad.

* * * * *